Nov. 26, 1940.      G. W. PARKER, JR      2,222,986
TRUCK BODY
Filed Dec. 1, 1938      14 Sheets-Sheet 5
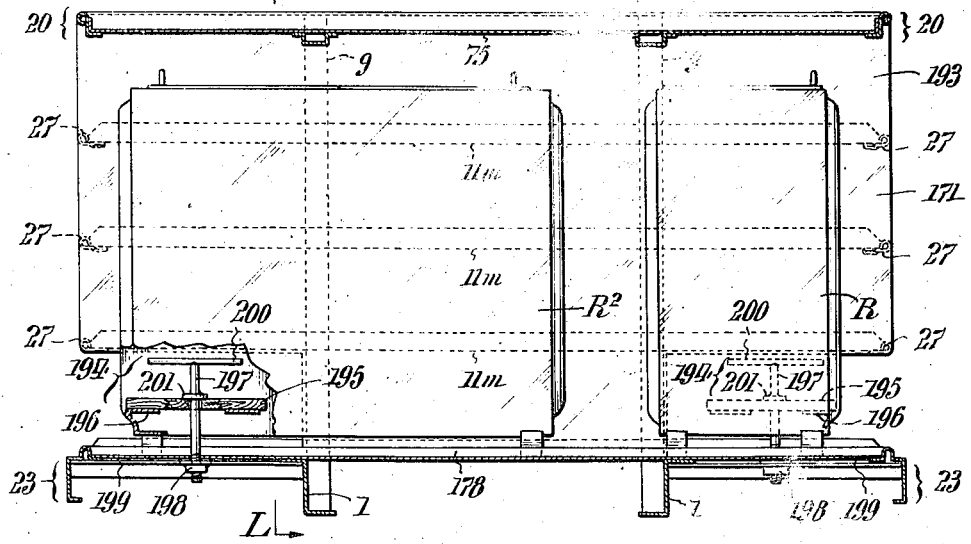
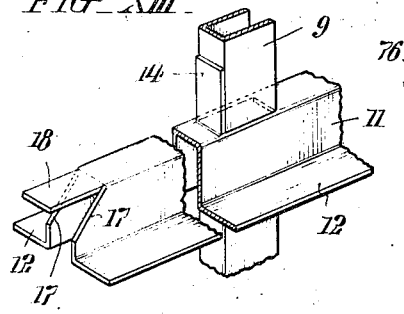
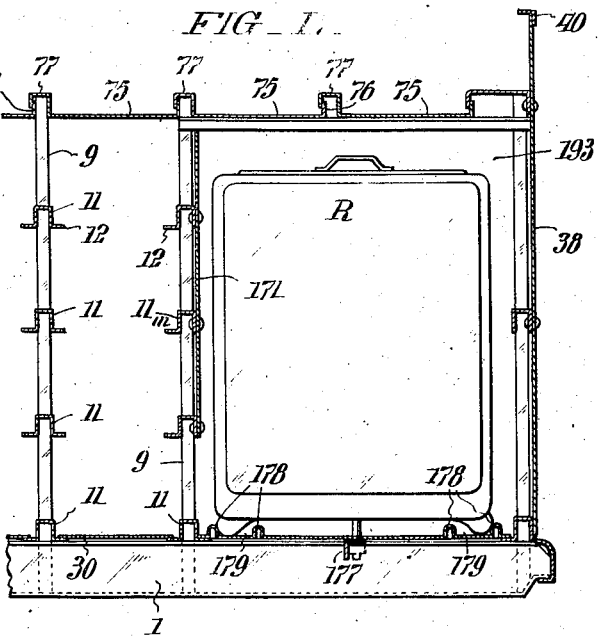
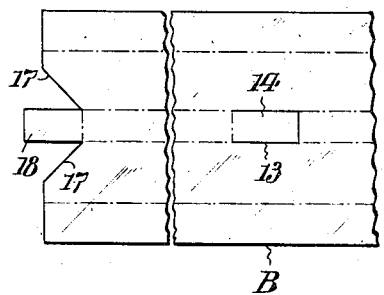
WITNESSES:
Hubert Fuchs
William Bell, Jr.
INVENTOR:
George W. Parker, Jr.,
BY Paul & Paul
ATTORNEYS.

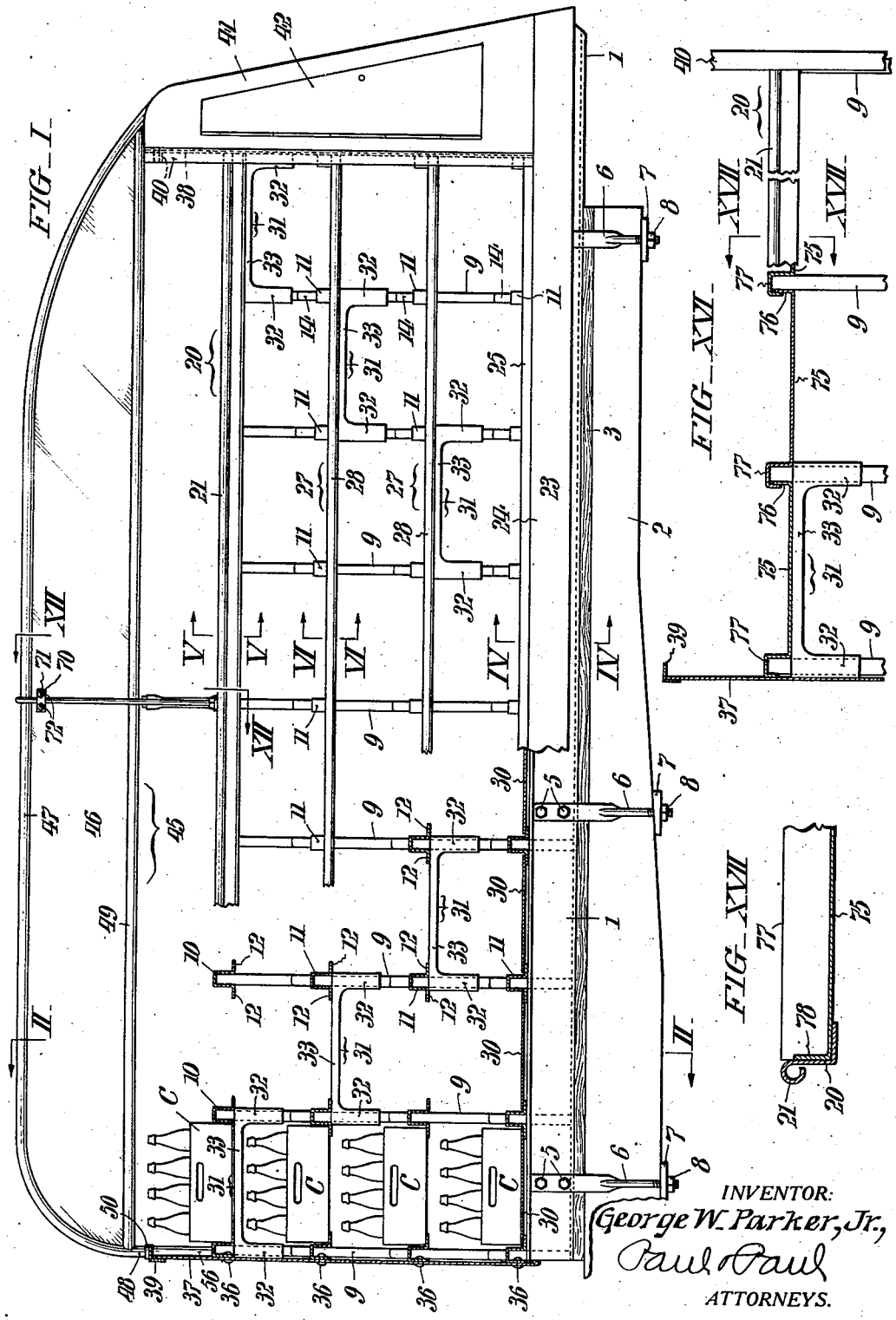

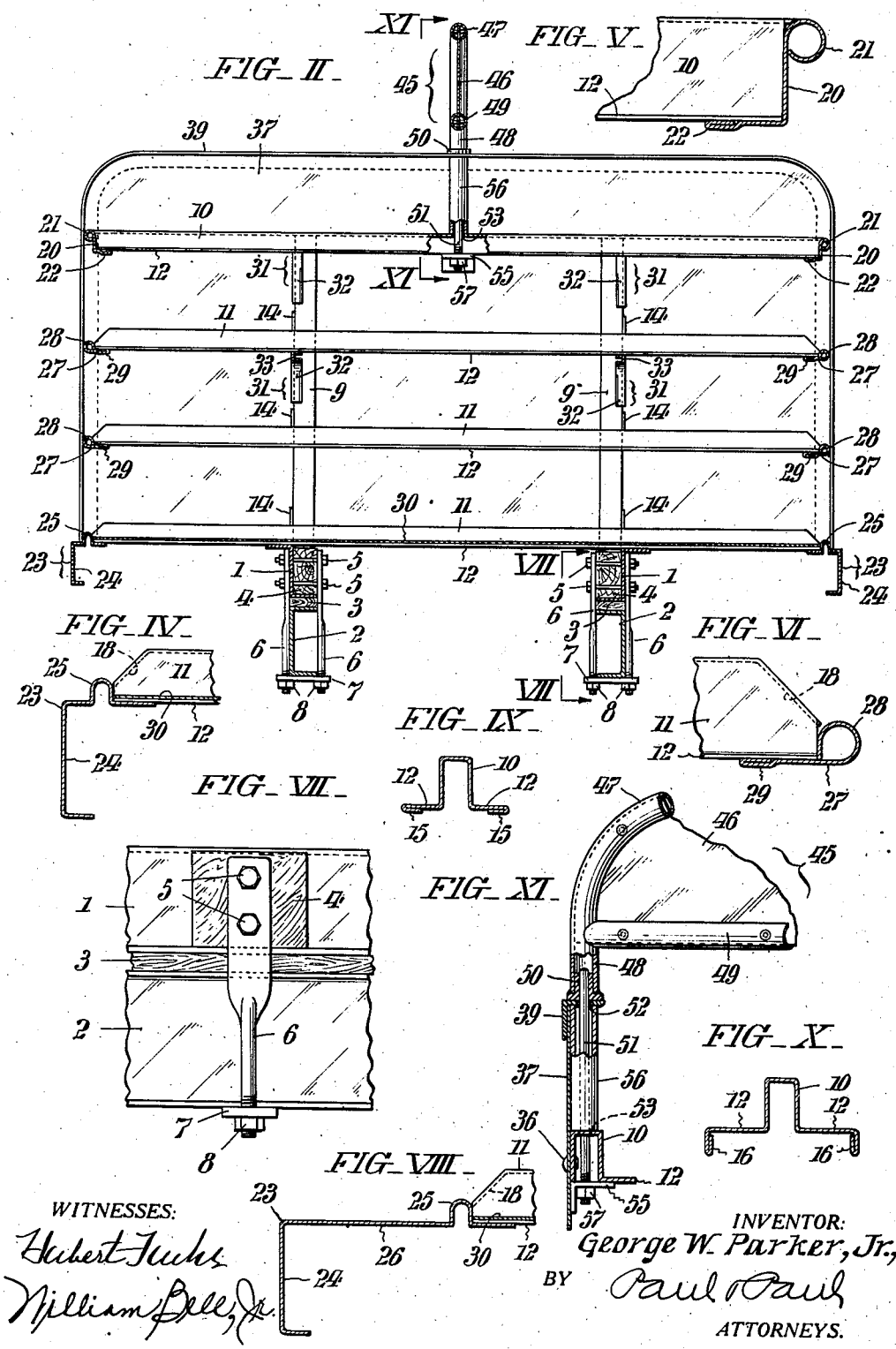

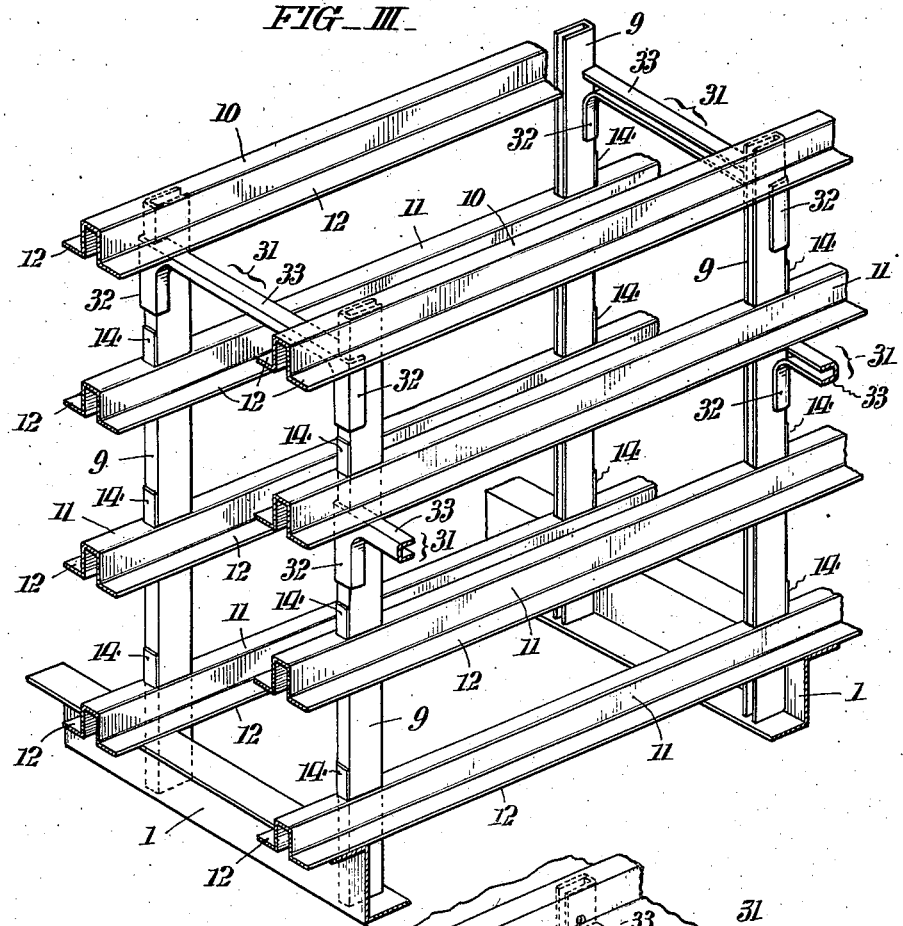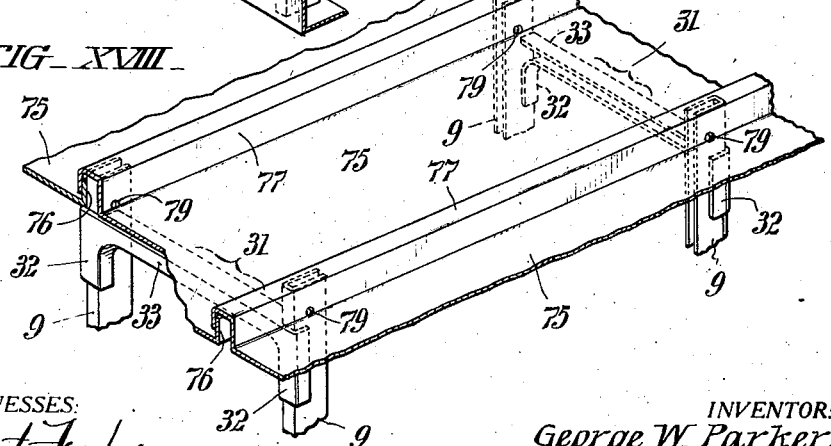

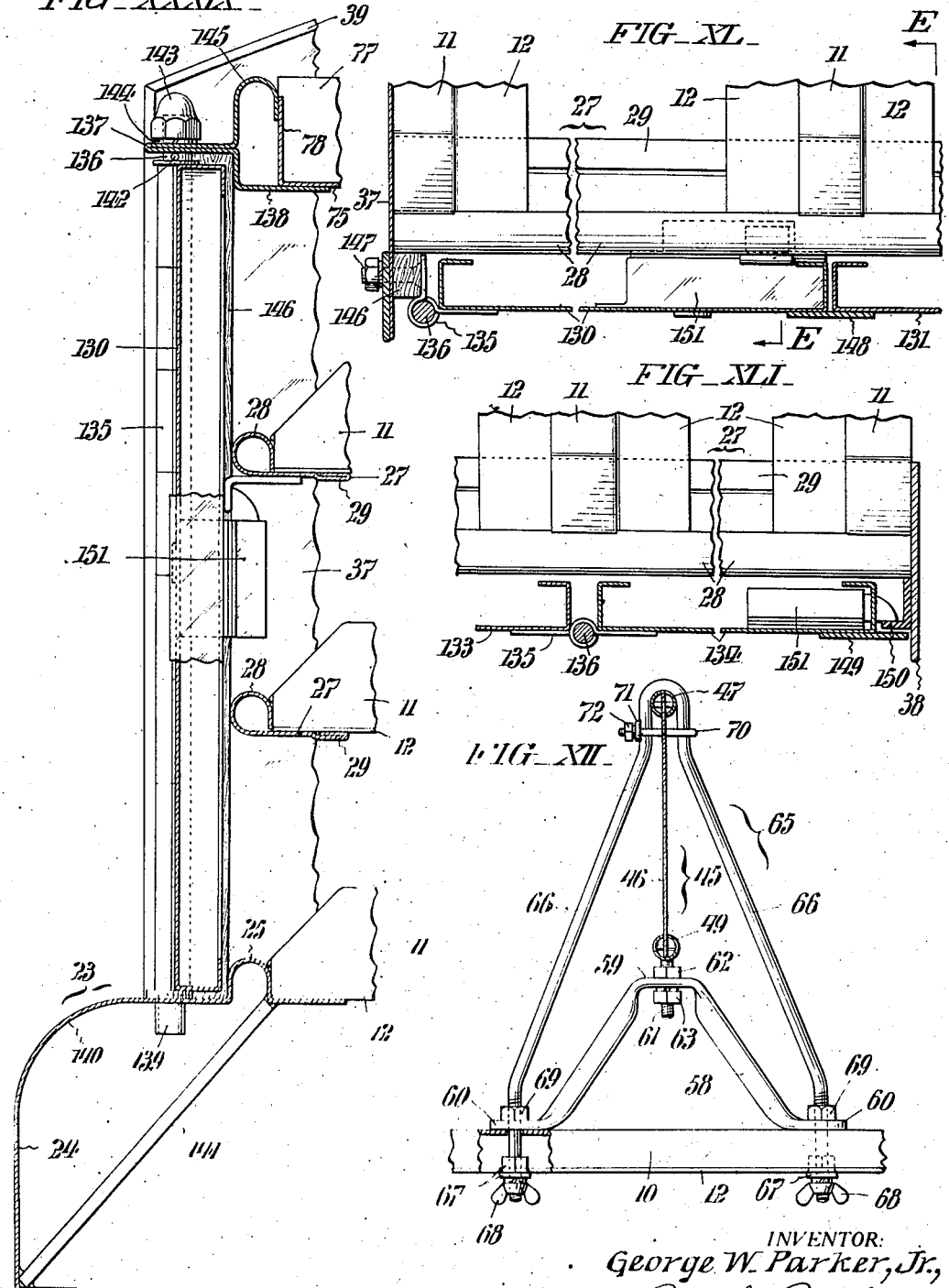

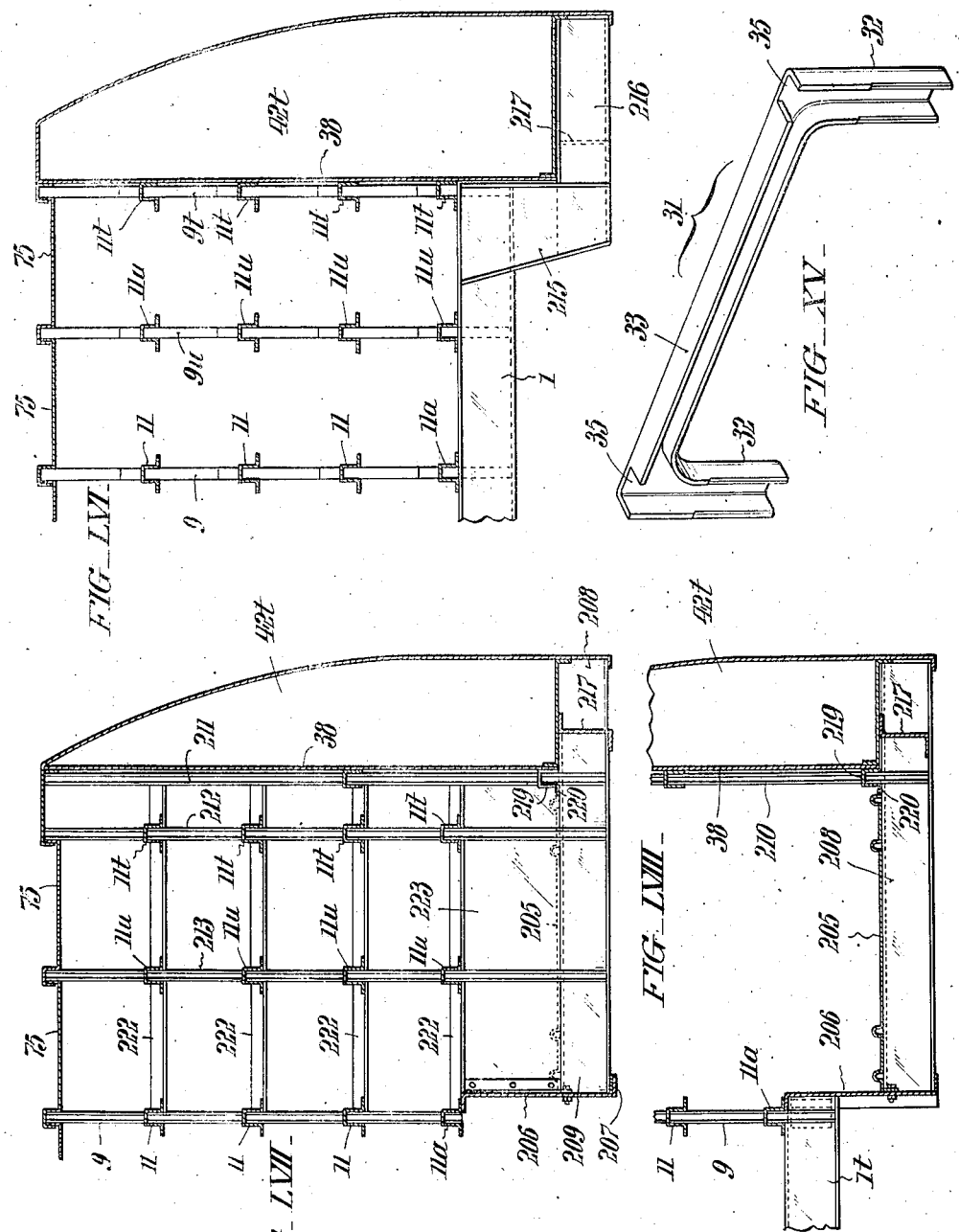

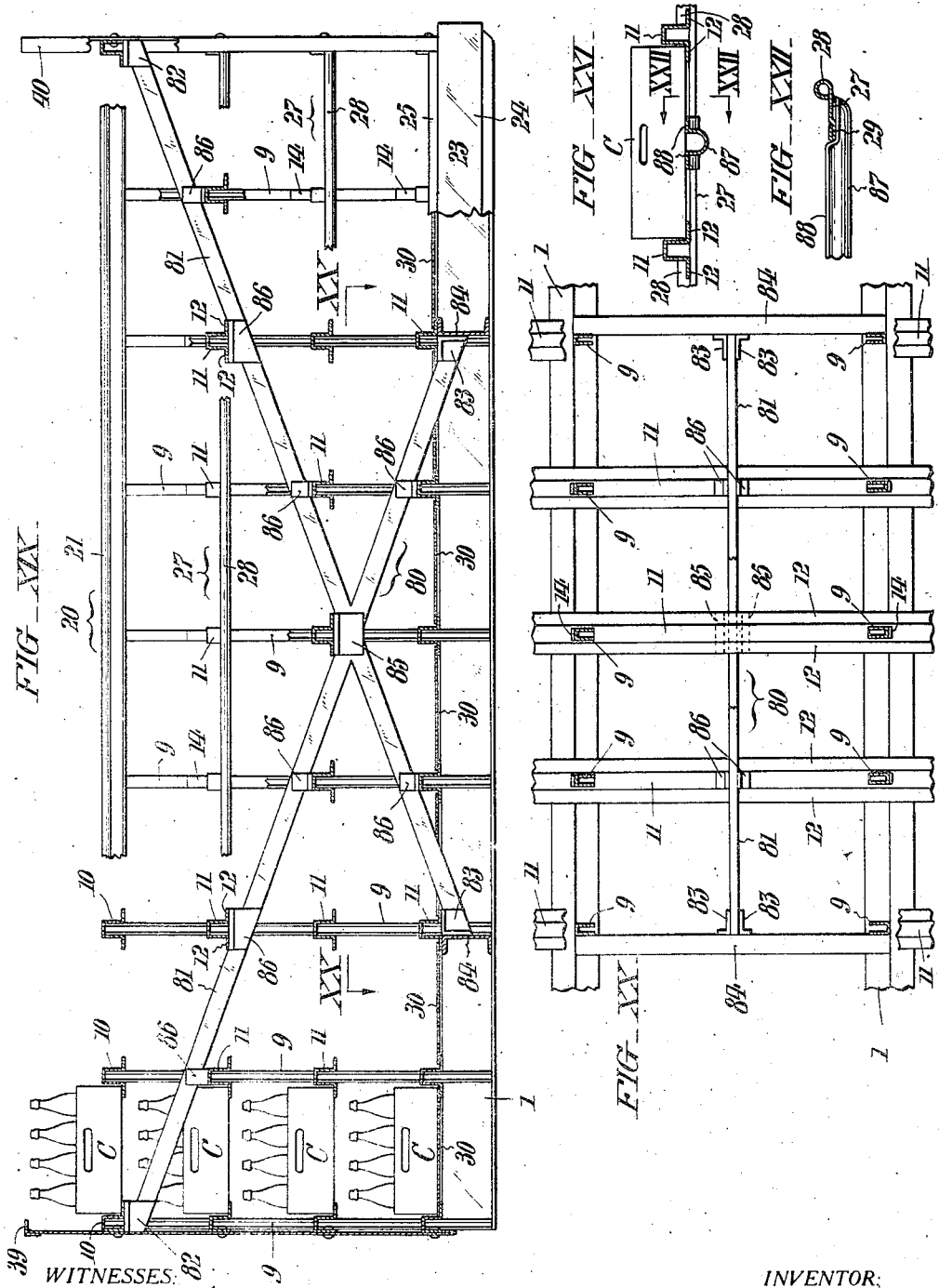

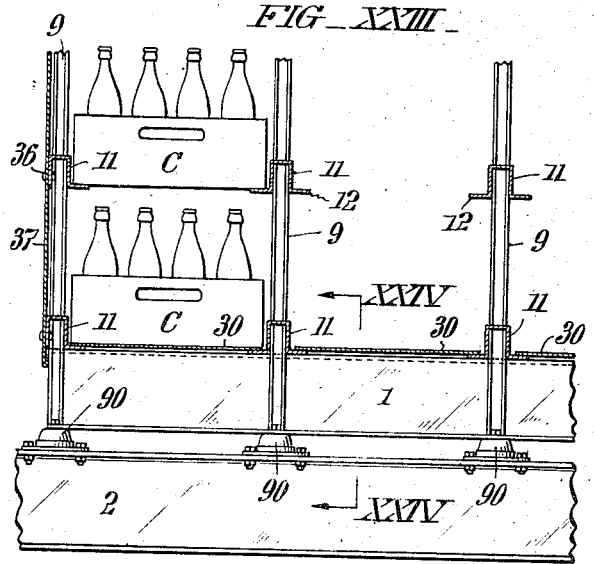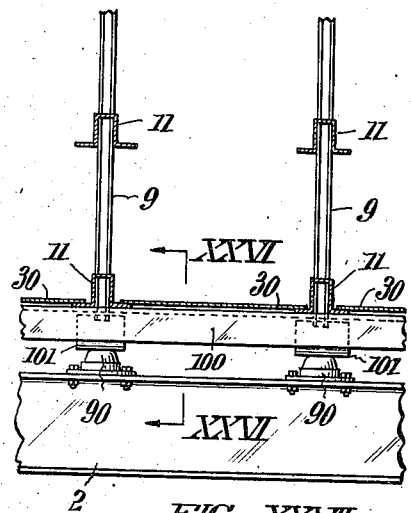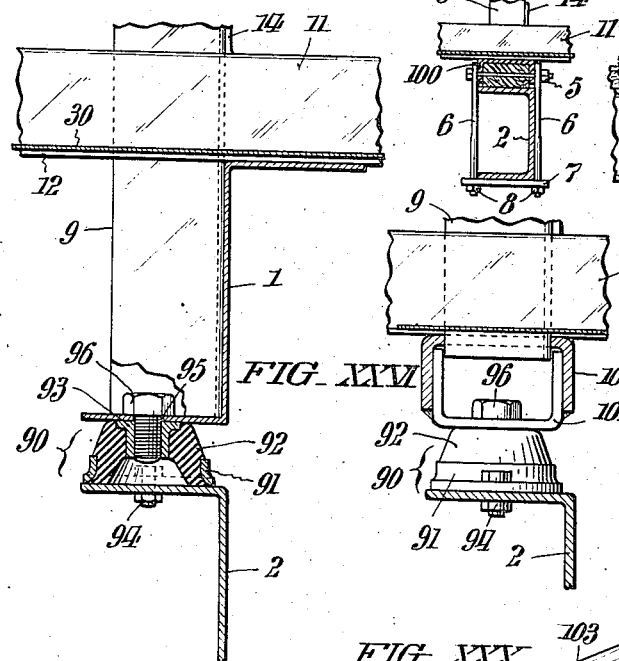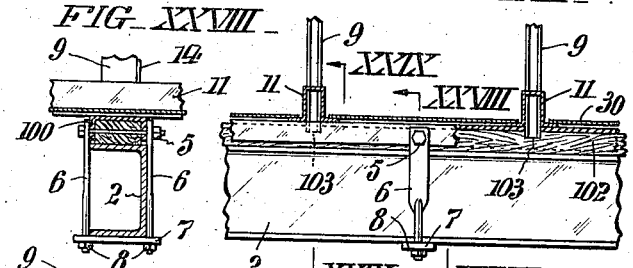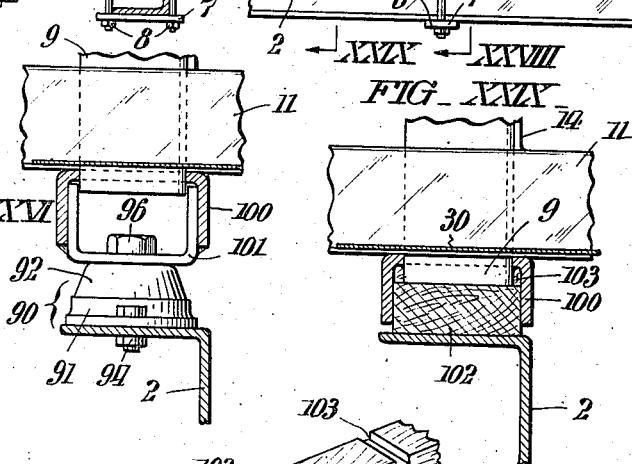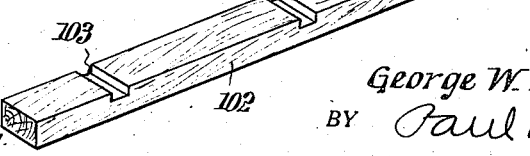

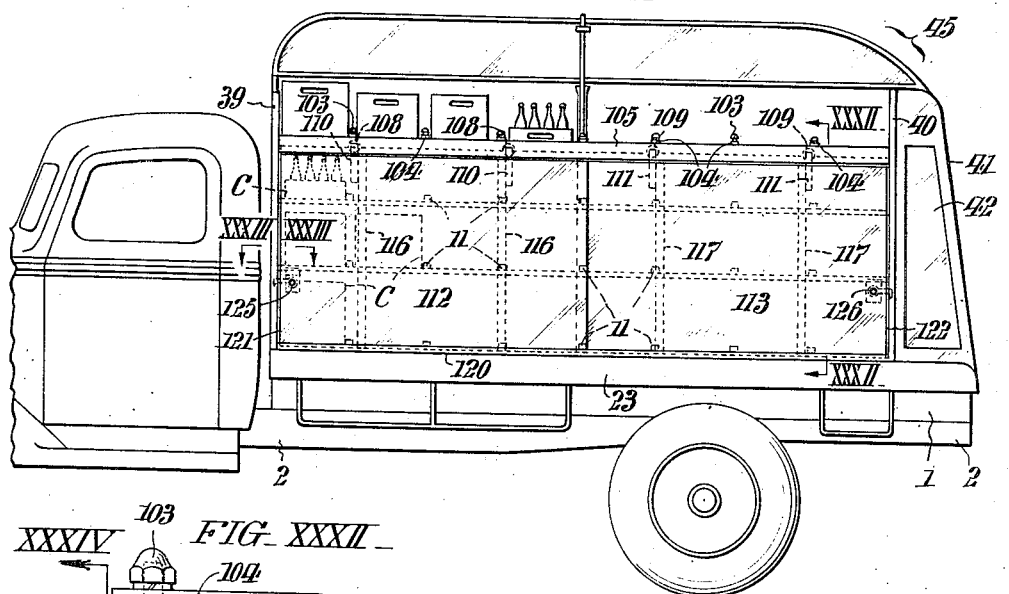

Nov. 26, 1940.   G. W. PARKER, JR   2,222,986
TRUCK BODY
Filed Dec. 1, 1938   14 Sheets-Sheet 10
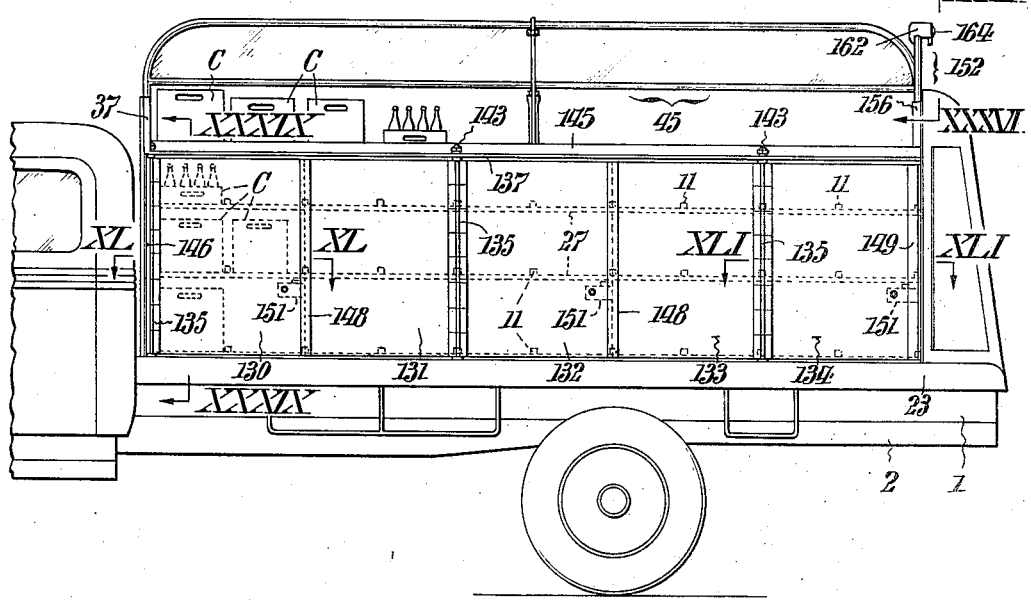
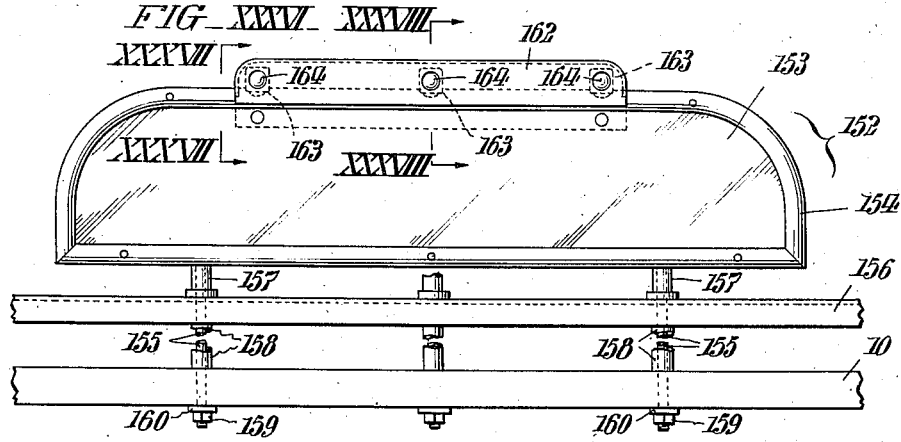
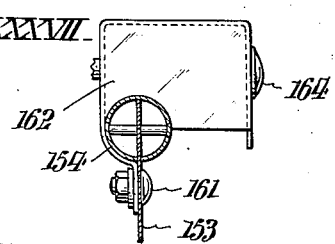
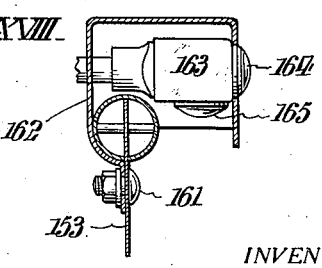
WITNESSES:
Hubert Tuhs
William Bell, Jr.
INVENTOR:
George W. Parker, Jr.,
BY Paul & Paul
ATTORNEYS.

Nov. 26, 1940.   G. W. PARKER, JR   2,222,986
TRUCK BODY
Filed Dec. 1, 1938   14 Sheets-Sheet 11
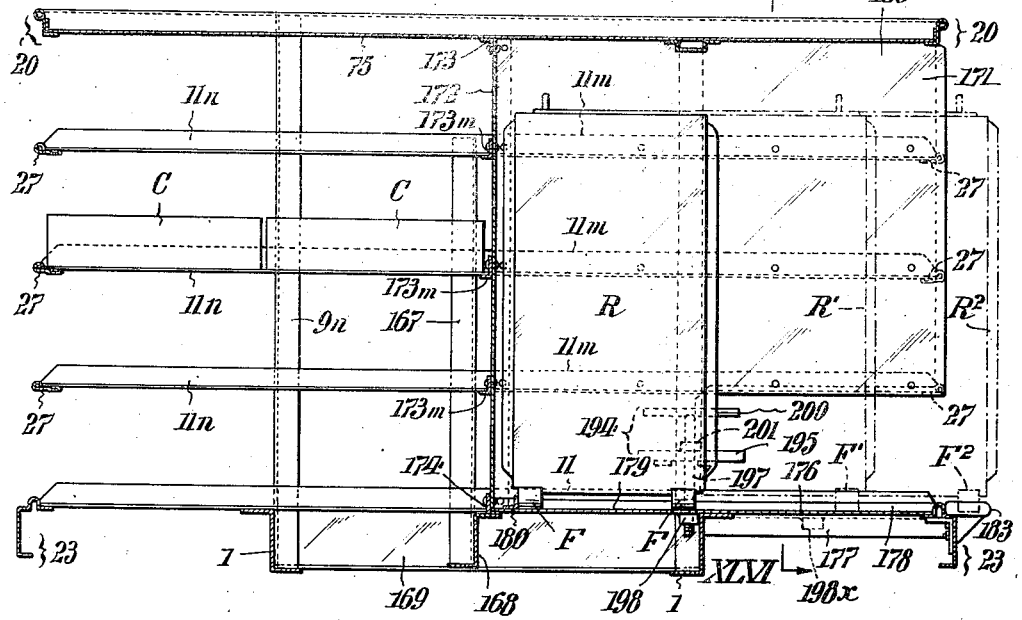
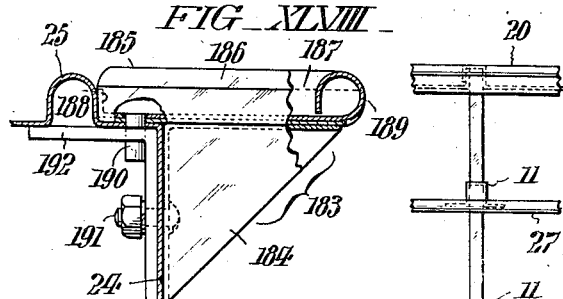
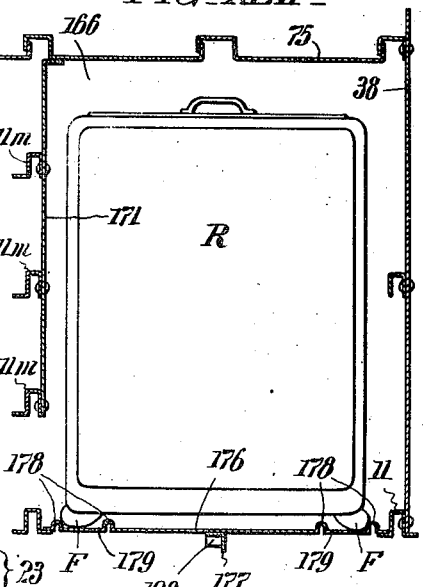
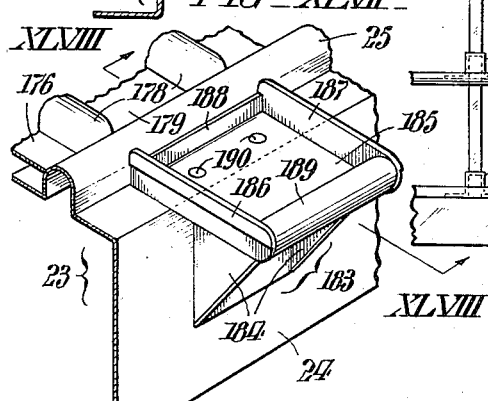
INVENTOR:
George W. Parker, Jr.,
BY Paul & Paul
ATTORNEYS.

Nov. 26, 1940.  G. W. PARKER, JR  2,222,986
TRUCK BODY
Filed Dec. 1, 1938   14 Sheets-Sheet 12
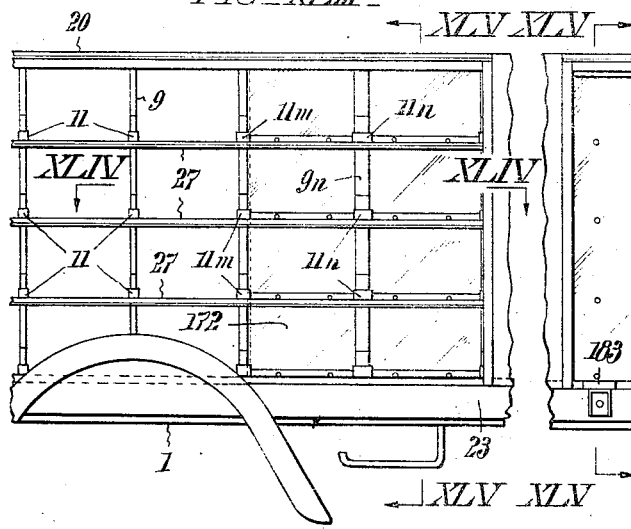
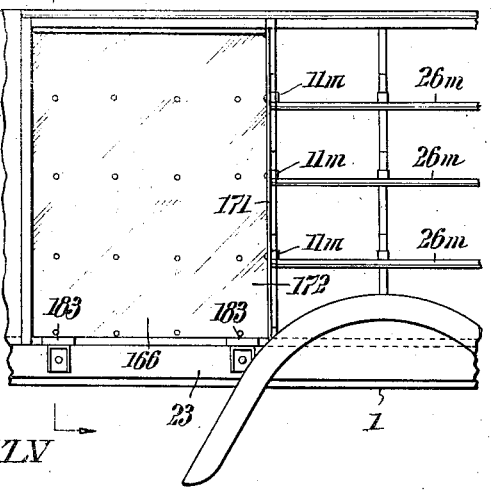
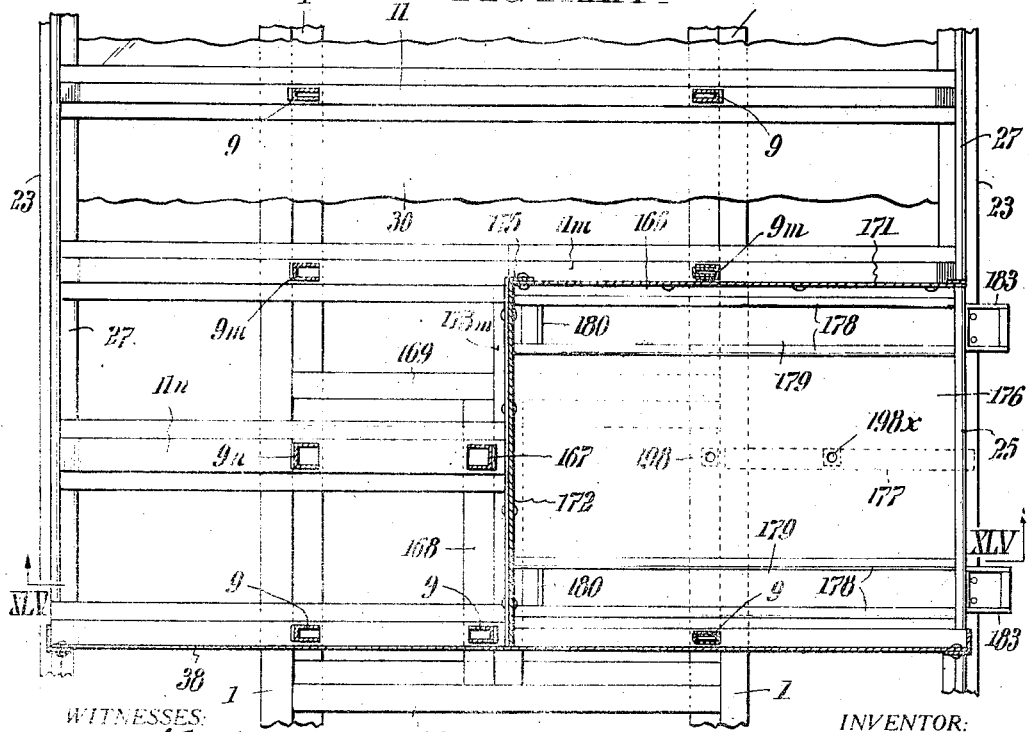
WITNESSES:
Hubert Fuchs
William Bell, Jr.
INVENTOR:
George W. Parker, Jr.,
BY Paul & Paul
ATTORNEYS.

Nov. 26, 1940.   G. W. PARKER, JR   2,222,986
TRUCK BODY
Filed Dec. 1, 1938   14 Sheets—Sheet 13
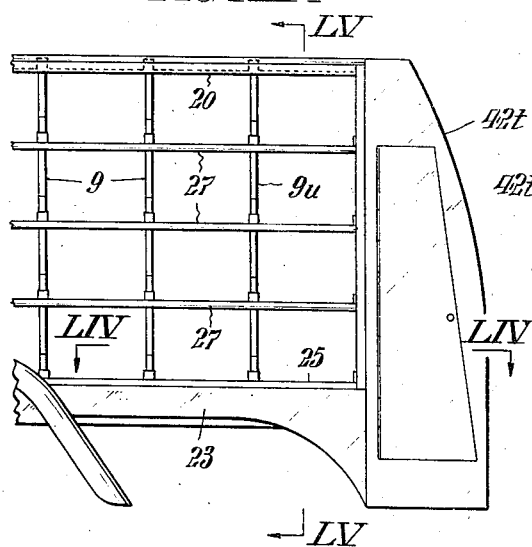
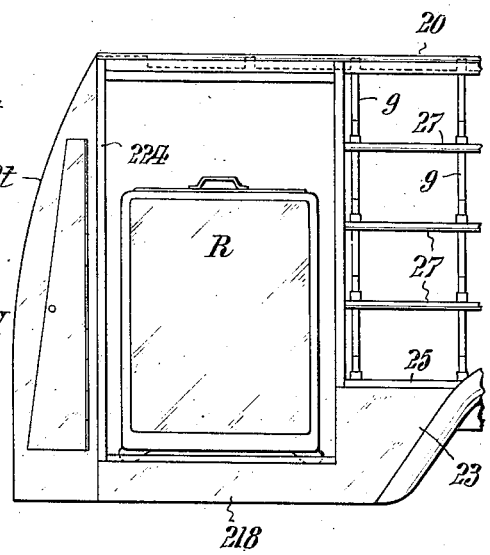
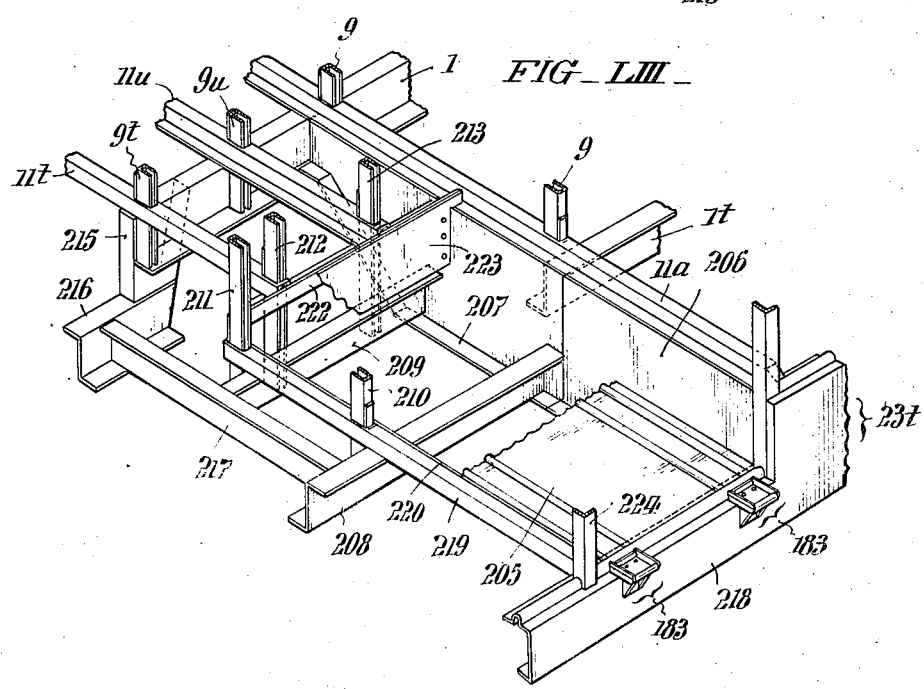
WITNESSES:
Hubert Fuchs
William Bell, Jr.
INVENTOR:
George W. Parker, Jr.,
BY Paul & Paul
ATTORNEYS.

Nov. 26, 1940.　　　G. W. PARKER, JR　　　2,222,986
TRUCK BODY
Filed Dec. 1, 1938　　　14 Sheets-Sheet 14
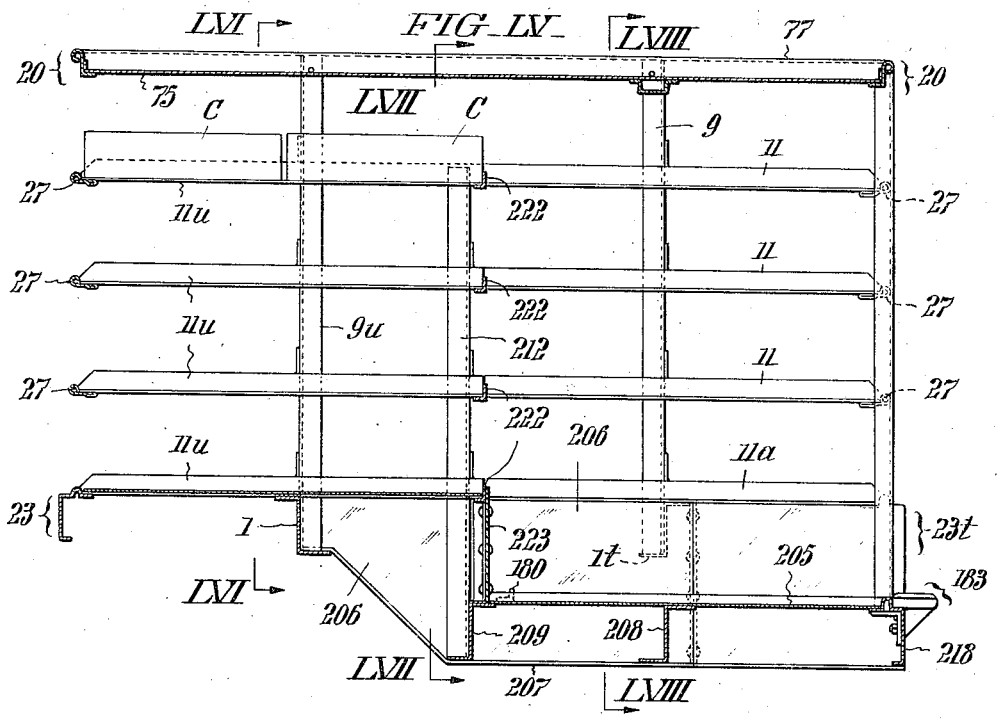
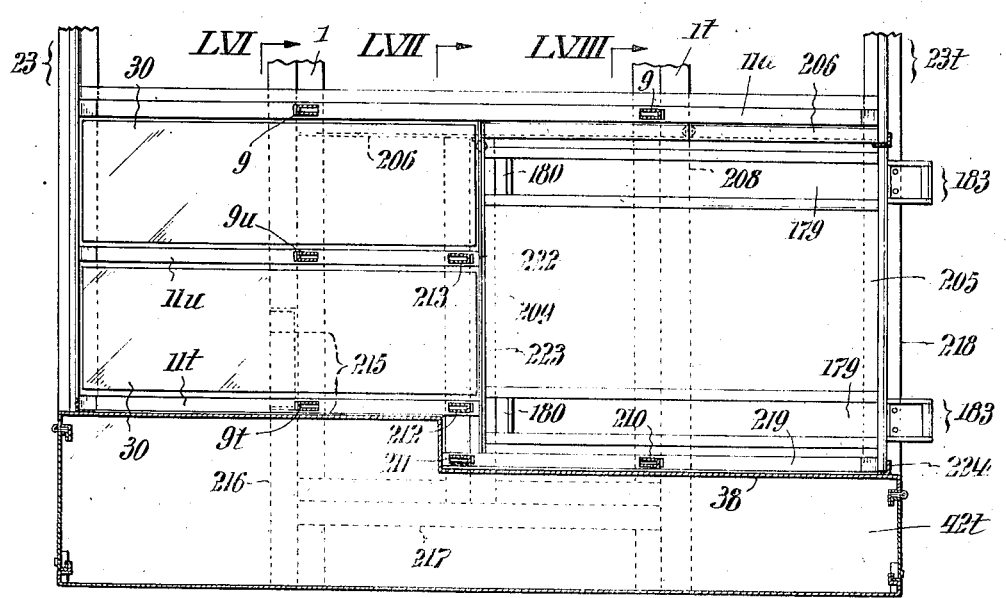

Patented Nov. 26, 1940

2,222,986

UNITED STATES PATENT OFFICE 2,222,986

TRUCK BODY

George W. Parker, Jr., Philadelphia, Pa., assignor to Specialty Engineering Company, Philadelphia, Pa., a corporation of Pennsylvania Application December 1, 1938, Serial No. 243,327

16 Claims. (Cl. 296—3)

This invention relates to metallic truck bodies of the type disclosed in U. S. Patent No. 2,024,596, granted to Charles G. Pfeiffer and John G. Ogden on December 17, 1935, and characterized by a skeleton framework with superposed rows of transversely-extending sub-divisions for bottle cases and the like, which subdivisions are accessible from opposite sides of the truck for convenience in loading and unloading.

One of the aims of my invention is to secure greater rigidity in truck bodies of the kind referred to for capacity to more effectively resist longitudinal and transverse strains created by the load and the shocks induced during travel of the vehicle, without adding materially to the weight of the body or obstructing the open subdivisions for the bottle cases. This objective I realize as hereinafter more fully disclosed, in a truck body having uprights or posts correspondingly-spaced along opposed sides of the body anchored at their lower ends in sills, which are laterally spaced to correspond with the longitudinals of the chassis frame of the truck; cross members connecting to transversely-aligned pairs of the uprights at different levels which extend beyond said uprights at opposite sides of the body and which have ledges for supporting the bottle cases between uprights; and bracing members which connect the cross members at different points and at different levels, so as to preclude swaying or flexing of the body irrespective of unequal load distribution.

Another object of my invention is to provide improved means for effectively securing the body against the possibility of shifting on the chassis frame of the truck.

My invention is further concerned with provision, in a truck body having the foregoing attributes, of an improved roof construction with ridges over the tops of transversely-aligned uprights which serve as barriers between bottle cases supported on the roof; of improved facilities for roof drainage by way of hollows in the uprights; of improved facilities for mounting sliding or swinging doors at opposite sides of the body; and improved facilities for effectively anchoring longitudinal and crosswise overhead advertising signboards on the body.

In addition to the above, I aim to provide improved facilities for carriage, within the confines of the body, of refrigerating coolers such as are used in establishments where beverages and other bottled products are sold or dispensed, as well as improved facilities for securing the coolers against displacement during transit.

Another object is to provide in the body framework simple and easily incorporated means for connecting thereto at the rear, a closed utility compartment having access doors at opposite sides of the truck.

Other objects and attendant advantages of my invention will appear from the following detailed description of the attached drawings, wherein Fig. I is a side view of a truck body constructed according to my invention.

Fig. II is a cross section of the truck body taken as indicated by the arrows II—II in Fig. I.

Fig. III is a fragmentary perspective view of the truck body.

Fig. IV is a detail cross sectional view taken as indicated by the arrows IV—IV in Fig. I through one of the bottom longitudinals or sills of the truck body.

Fig. V is a detail cross section taken as indicated by the arrows V—V in Fig. I through one of the top side rails of the body.

Fig. VI is a detail sectional view taken as indicated by the arrows VI—VI through one of the intermediate side rails of the body.

Fig. VII is a fragmentary view in elevation looking as indicated by the arrows VII—VII in Fig. II.

Fig. VIII is a detail view corresponding to Fig. IV showing a modified form of a side apron.

Fig. IX is a cross sectional view of an alternative form of cross member.

Fig. X is a view corresponding to Fig. IX showing still another alternative form of cross member.

Fig. XI is a detail sectional view taken as indicated by the arrows XI—XI in Fig. II, showing how the overhead sign is secured to the rear end of the body.

Fig. XII is a detail sectional view taken as indicated by the arrows XII—XII in Fig. I.

Fig. XIII is a perspective view showing a structural detail of the body.

Fig. XIV is a fragmentary view showing one of the blanks from which the cross members of the body are formed.

Fig. XV is a perspective view of one of the longitudinal braces of the truck body.

Fig. XVI is a fragmentary view corresponding to Fig. I showing an alternative form of my invention in which the truck body is provided with a roof.

Fig. XVII is a detail sectional view taken as indicated by the arrows XVII—XVII in Fig. XVI.

Fig. XVIII is a fragmentary view in perspective of the modified frame shown in Fig. XVI.

Fig. XIX is a view corresponding to Fig. I, showing an alternative form of brace construction.

Fig. XX is a detail sectional view in plan taken as indicated by the arrows XX—XX in Fig. XIX.

Fig. XXI is a detail sectional view showing an intermediate support for the bottle cases or packages.

Fig. XXII is a detail sectional view taken as indicated by the arrows XXII—XXII in Fig. XXI.

Fig. XXIII is a view corresponding to Fig. I showing an alternative form of bottom sill construction.

Fig. XXIV is a detail sectional view taken as indicated by the arrows XXIV—XXIV in Fig. XXIII.

Fig. XXV is a view corresponding to Fig. XXIII, showing still another alternative form of sill construction.

Fig. XXVI is a detail sectional view taken as indicated by the arrows XXVI—XXVI in Fig. XXV.

Fig. XXVII is a view corresponding to Fig. XXIII and showing still another alternative form of sill construction.

Figs. XXVIII and XXIX are detail sections taken respectively as indicated by the arrows XXVIII—XXVIII and XXIX—XXIX in Fig. XXVII.

Fig. XXX is a perspective view of the cushioning member used in the modification shown in Figs. XXVII–XXIX.

Fig. XXXI is a side elevation of a truck body construction in accordance with my invention and having longitudinally slidable side doors.

Figs. XXXII and XXXIII are detail sectional views taken as respectively indicated by the arrows XXXII—XXXII and XXXIII—XXXIII in Fig. XXXI.

Fig. XXXIV is a detail sectional view indicated by the arrows XXXIV—XXXIV in Fig. XXXII.

Fig. XXXV is a view like Fig. XXXI of a truck body construction in accordance with my invention having hinged side doors and a crosswise advertising signboard at the back.

Fig. XXXVI is a view looking as indicated by the arrows XXXVI—XXXVI in Fig. XXXV.

Figs. XXXVII and XXXVIII are detail sectional views taken as indicated by the arrows XXXVII—XXXVII and XXXVIII—XXXVIII in Fig. XXXVI.

Figs. XXXIX, XL and XLI are fragmentary sectional views taken as indicated by the arrows XXXIX—XXXIX, XL—XL and XLI—XLI in Fig. XXXV.

Fig. XLII is a fragmentary elevation of one side of an alternative form of my improved truck body having a compartment in the rear for a refrigerating cooler.

Fig. XLIII is an elevation of the opposite side of the truck body shown in Fig. XLII.

Fig. XLIV is a fragmentary plan view taken as indicated by the arrows XLIV—XLIV in Fig. XLIII.

Fig. XLV is a transverse sectional view taken as indicated by the arrows XLV in Figs. XLIII and XLIV.

Fig. XLVI is a view partly in side elevation and partly in section taken as indicated by the arrows XLVI—XLVI in Fig. XLV.

Fig. XLVII is a perspective view showing a bracket extension provided on the truck body of Figs. XLVII–XLVI for supporting a foot of the cooler.

Fig. XLVIII is a detail sectional view taken as indicated by the arrows XLVIII—XLVIII in Fig. XLVII.

Fig. XLIX is a transverse sectional view like Fig. XLV of another alternative form of my improved truck body with a compartment for coolers which extends all the way across the body.

Fig. L is a fragmentary longitudinal sectional view of the truck body of Fig. XLIX taken as indicated by the arrows L—L in the latter illustration.

Figs. LI and LII are views in elevation like Figs. XLII and XLIII of another alternative form of truck body of my invention, in which the floor of the compartment for the coolers is depressed.

Fig. LIII is a fragmentary perspective view of the truck body shown in Figs. LI and LII.

Fig. LIV is a plan section taken as indicated by the arrows LIV—LIV in Fig. LII.

Fig. LV is a cross section taken as indicated by the arrows LV—LV in Fig. LII; and Figs. LVI, LVII and LVIII are fragmentary longitudinal sections taken as indicated respectively by the arrows LVI—LVI, LVII—LVII and LVIII—LVIII in Figs. LIV and LV.

Referring first more particularly to Figs. I–XV, the form of my invention therein illustrated has a pair of sills 1 which are laterally spaced to correspond with the channel longitudinals 2 of the truck chassis. The sills 1 are in this instance of Z-cross sectional configuration with upper flanges extending outwardly and with their bottom flanges extending inwardly of the body and resting on cushioning strips 3 of wood or the like superposed upon the chassis frame channels 2. Set into the angles between the bottom flanges and the vertical webs of the sills 1 at suitable points lengthwise of the truck body are filler blocks 4 of wood or the like; and secured at these regions by transverse bolts 5 are anchoring straps 6 which extend downwardly of opposite sides of the chassis frame channels 2. Fitting over the lower threaded ends of the straps 6 are apertured washer plates 7 which are drawn up tight against the bottoms of the chassis channels 2 by nuts shown at 8. By the means just described, the body is effectively secured against both longitudinal and lateral shifting on the truck chassis. The uprights of the truck body have the form of posts 9 of narrow channel cross section, which are correspondingly-spaced along the two sills 1 with their hollows facing inward. As shown in Figs. II and III, the uprights 9 rest upon the bottom flanges of the sills 1 and are backed up against the vertical webs of said sills to which latter they are rigidly secured as by welding. The vertically-spaced cross members 10 and 11 of the truck body are fashioned from sheet metal blanks such as shown at B in Fig. XIV to invert U-cross-section with incidental provision of lateral flanges 12 for supporting bottle cases C or the like at the different levels between uprights, and are of a length to extend a considerable distance beyond the uprights 9 at each side of the truck body as shown in Fig. II. The upper cross members 10 are placed over the tops of the uprights 9 and welded directly to them. All the other cross members 11 are punched, as instanced at 13 in Fig. XIV, to provide tongues 14 which are turned perpendicularly as shown in Fig. XIII, and also openings which correspond in size and shape to the cross section of the uprights 9. In assembling the truck body, the cross members 10 are slipped down over the uprights 9 and secured at the desired levels through welding of the tongues 14 to the outer faces of said uprights.

For greater security and rigidity welding is resorted to at other regions of mutual contact between the uprights 9 and the cross members 10, 11, the lowermost cross members 11 being also welded fast to the upper flanges of the sills 1, see Fig. II and Fig. III.

An alternative construction of cross members is shown in Fig. IX wherein the edges of the lateral flanges 12 are folded downwardly and inwardly as at 15 to add stiffness and to preclude sharp edges.

Fig. X shows another alternative form of cross member in which the edges of the flanges 12 are retroverted and downwardly bent as at 16.

The ridge portions of the cross members 11 are beveled at their ends, Figs. II, IV and VI. This construction results as a consequence of angle notching the ends of each blank B as at 17 in Fig. XIV and bending down the tongue 18 incidentally formed against the sloping edges of the cuts after the cross member is otherwise formed as in Fig. XIII, and finally welding together the contiguous edges of said tongue and notches. At their outer ends, the upper cross members 10 are connected by longitudinally-extending rails 20 which are generally of angular cross section, see Figs. II and V, the upright flanges of said rails being finished off at the top with outwardly rolled beads 21, and the bottom flanges having their edges retroverted as at 22 for stiffening. As shown, the rails 20 are butted against the ends of the cross members 10 with their horizontal flanges underreaching said cross members, and in practice are secured to the latter by welding along the regions of mutual contact. The lowermost cross members 11 are connected at their ends by longitudinal rails 23 which are of right angle cross section reversely-arranged with respect to the top rails 20, i. e., with their vertical flanges directed downward as at 24 and constituting aprons along opposite sides of the body. As shown, the horizontal flanges of the lowermost rails 23 are formed with upstanding longitudinal beads 25 which are butted against the ends of the lowermost cross members 11 with the margins of said horizontal flanges underreaching the ends of said cross members. Attachment is here also preferably effected by welding. In addition to serving as stiffening, it will be seen that the beads 25 determine the proper positioning of the rails 23 in assembling the truck body. The upstanding beads 21, 25 and 28 of the respective side rails 20, 23 and 27, it will be noted from Fig. II, serve as guards to prevent the bottle cases C from sliding out of the truck.

As an alternative, the lowermost side rails 23 may be extended as exemplified in Fig. VIII to provide cat walks 26 along opposite sides of the truck body.

The cross members 11 intermediate the top and bottom rails 20, 23 are in turn connected at their ends by longitudinal rails 27 which have upwardly rolled beads 28, see Fig. VI, at their outer edges, and which are stiffened by retroversions 29 at their inner edges. The side rails 27 are butted against the ends of the cross members 11, also as shown in Fig. VI, and welded fast to the bottoms of said cross members. The floor of the truck body is formed by sheets 30 laid crosswise between the side flanges 12 of the lowermost cross members 11, see Figs. I and II.

For the purpose of reinforcing the truck body, I have in this instance provided braces 31 whereof one is illustrated in perspective in Fig. XV, each such brace being integrally formed from sheet metal with vertical portions 32 of channel cross section spaced to correspond with the spacing of the uprights 9, and with a horizontal portion 33 likewise of channel section connecting said vertical portions at the top. As shown, the top flanges of the horizontal portion 33 of each brace 31 are notched as at 35 in line with the hollows of the vertical portions. From Figs. I and III, it will be observed that the braces 31 are placed immediately below the cross members 10 and 11 with their vertical portions embracing neighboring uprights 9 at opposite sides of the truck body. The braces 31 are permanently secured by welding at the regions of mutual contact with the uprights and the lateral flanges 12 of the cross members 10 and 11. While the braces may be employed throughout the truck, ample reinforcement is ordinarily had by arranging them diagonally as shown in Fig. I, that is to say, by stepping them downwardly from the top of the truck body at opposite ends toward the center of the body. This arrangement of the braces 31 is resorted to in practice irrespective of the length or height of the truck, or of the number of tiers provided for the bottle cases C. It is to be especially noted that the braces 31 add very little weight, nor do they materially obstruct the spaces or subdivisions for the bottle cases C.

The cross members 10 and 11 at opposite ends of the truck (Fig. I) are devoid of lateral flanges at their outer sides; and secured to them by bolts 36 are front and rear end wall sheets 37, 38. As shown in Fig. I, the end wall sheets 37 and 38 extend above the level of the top cross members 10, and are respectively framed by angle irons 39 and 40, which, see Fig. II extend crosswise of the top edges and down the opposite side edges of said sheets. As shown in Fig. I, the sheet 38 constitutes the inner wall of a utility compartment 41 which is supported on the rearwardly overhanging ends of the sills 1, said compartment having hinged doors at opposite sides of the truck body, one such door being indicated at 42.

Extending longitudinally of the top of the truck body at the center is a signboard 45 which is intended to be used for advertising matter, the same having a panel 46 of sheet metal and a tubular frame. At the front end of the signboard, the upper member 47 of the frame is bent downwardly as at 48 and extends somewhat below the point of juncture with the lower component 49 of said frame, see Figs. I, II and XI. Secured into the pendant end of the tube 48 is a bushing 50 which rests on the top of the horizontal flange of the crosswise portion of the framing angle 39 of the rear wall sheet 37; and fixed axially within said bushing is a shank 51 which extends downwardly through aligned apertures 52, 53 respectively in said angle and in the upper cross member 10 at the corresponding end of the truck body, as well as through an angle lug 55 attached to said front end wall. In the interval between the angle 39 and the upper cross member 10, the shank 51 of the sign passes through a tubular spacer 56. By means of a nut 57 engaging the lower threaded end of the shank 51 and bearing against the lug 55, the signboard 45 is securely anchored at the front end of the truck body. The signboard 45 is secured at the rear end of the truck body in a similar manner by means of a pendant shank (not shown) secured to the tube 49 in the region of the rear wall sheet 38. Midway of the length of the truck body, the signboard 45 is supported by a pedestal 58 formed from a length of tubing with a flattened bearing portion 59 centrally of its top and with feet 60 to rest on one of the upper cross members 10. The bearing portion 59 of the pedestal 58 is apertured for passage of a centrally-located pendant anchorage screw shank 61 on the signboard 45, said shank being provided with clamp nuts at 62 and 63 which engage said bearing portion from above and below. Associated with the pedestal 58 is a similarly-shaped hold down yoke 65 which extends over the top of the signboard 45, and which has its extremities 66 diverging downwardly and passing through registering holes respectively in the feet 60 of said pedestal and in the cross member 10. Fitting over the protruding lower ends of the yoke extremities 66 and spanning the hollow of the cross member 10 are washer plates 67 which are drawn up tight by means of nuts 68 engaging the screw threads on the ends of said extremities. An additional pair of nuts 69 on the yoke shanks serve as a means for securing the pedestal 58 in place on the supporting cross member 10. The horizontally-disposed U-bolt shown at 70 embraces the top of the yoke 65 below the upper tube member 47 of the signboard 45. As illustrated, the extremities of the U-bolt 70 pass through the panel 46 of the sign 45 and also through a connecting washer plate 71 which is backed by securing nuts 72.

When a roof is desired on the truck body, I provide, in lieu of the upper cross members 10, roof sheets such as shown at 75 in Figs. XVI–XVIII. One side edge of each such roof sheet 75 is turned up to form a flange 76 to abut against the uprights 9 constituting a transverse row, while the other side edge is formed with a square box bead or ridge 77 to fit over the tops of the uprights 9 constituting the next adjacent transverse row and to lap over the flange of another of the roof sheets—all as shown in Fig. XVI. At opposite ends, the roof sheets 75 are formed with perpendicular flanges 78 which abut the vertical flange portions of the top rails 20, see Fig. XVII. After the roof sheets 75 have been placed as just explained, they are welded fast to each other at the regions of overlap and to the other parts of the body with which they contact. By virtue of this construction, transverse barriers are formed over the tops of transversely-aligned pairs of the uprights to separate bottle cases placed in the roof. Drain of the roof subdivisions between the ridges 77 is by way of corner apertures 79 (Fig. XVIII) which lead into the hollows of the uprights 9 from whence the water escapes at the bottom over the lower flanges of the sills 1 in a manner obvious from Fig. III.

Figs. XIX and XX show a modified truck body which is generally like the first described form except for the bracing means which here is a spider-like unit 80 with crossed diagonal bars 81 disposed in the longitudinal median plane of the body. At their upper ends, the bars 81 of the bracing unit are welded fast to angle pieces 82 which are in turn welded fast to the endmost of the top cross members 10, and at their lower end similarly secured to angle pieces 83 on channel beams 84 extending transversely between the sills 1. At the region of intersection of the bars 81, the spider 80 is secured by an angle piece 85 to one of the cross members 11 at the center of the truck, and at intermediate points, by others 86 of the cross members 10.

In instances where the cases C are exceptionally wide, I provide, see Figs. XXI and XXII, supplemental supporting cross members 87 midway between the usual cross members 11. As shown, the supplemental cross members 87 are of U-cross section with lateral flanges 88. At the ends of the supplemental cross members 87, the flanges 88 are depressed to underlap the side rails 27 to which they are secured by welding.

The alternative form of anchorage means for the truck body shown in Figs. XXIII and XXIV includes a multiplicity of cushioning elements 90 which are interposed between the sills 1 and the chassis frame longitudinals 2 beneath the uprights or posts 9. These cushioning elements 90 may be of the type having an annular base 91 with a hollow frusto-conical insert 92 of rubber or other resilient material which extends well above said base portion and in which is axially embedded an internally threaded bushing 93. The bases 91 of the elements 90 are secured to the top flanges of the chassis longitudinals by bolts 94, and the bottom flanges of the sills 1 are apertured as at 95 in Fig. XXIV for passage of the shanks of securing cap screws 96 down into the bushings 93 of said elements. Due to the arrangement just described, it will be apparent that the shocks received by the truck body will be transmitted, through the uprights 9 to the elements 90 for absorption by the resilient components 92 of the latter.

In the modification featured in Figs. XXV and XXVI, the sills 100 are of channel formation positioned with their hollows facing downward, and having openings in their cross webs into which the bottom ends of the uprights 9 extend and in which said uprights are secured by welding. Welded in turn into the hollows of the sills 100 are U-lugs 101 which are pierced centrally for passage of the shanks of cap screws 96 by which the body is fastened to cushioning elements 90 exactly like those of the immediately preceding modification, on the chassis frame longitudinals 2.

The sills 100 in Figs. XXVII–XXIX are of channel section like those of the modification immediately above, but here, instead of multiple cushioning elements, I interpose between said sills and the chassis longitudinals stringers 102 of wood. As shown, the stringers 102 fit the hollows of the sills 100 and are grooved transversely as at 103 in Figs. XXVII and XXX to provide recesses for the lower ends of the uprights or posts 9. Anchorage is in this instance effected in a manner similar to that shown in Fig. I, i. e., by means of pendant straps 6 having screw shanks which extend downwardly from the sills 100 at opposite sides of the chassis longitudinals, and with which are associated washer plates 7 and clamp nuts 8. The securing bolts 5 for the straps 6 in Figs. XXVII and XXVIII, it will be noted, pass transversely through the side flanges of the sills 100 as well as through the stringers 102.

In the alternative form of truck body featured in Figs. XXXI–XXXIV, the top side rails 105 are of hollow square cross sectional configuration with longitudinal slots 106 medially of their bottoms, and with guard flanges 107 upstanding from the slot edges. The tracks thus afforded within the rails 105 at opposite sides of the slots 106 serve to retain and guide rollers 108 and 109. As shown in Figs. XXXI and XXXII, the top rails 105 are secured by screw bolts 103 to the projecting overhanging end portions of lug plates 104 welded fast to the tops of the roof ridges 77.

Suspended from the rollers 108, 109 at each side of the truck body by means of hangers 110, 111 is a pair of sliding doors 112, 113 which, when closed as illustrated in Fig. XXXI, overlap by a slight margin at the center of said body. The doors 112, 113 are fashioned from sheet metal with perimetric box flanges 114 and 115 respectively, and are braced at the back by vertical angle bars 116, 117 whereto the hangers 110, 111 are secured by bolts 118, 119. The bottom edges of the doors 112, 113, project into centrally-partitioned guides 120 (Figs. XXXI and XXXII) of sheet metal secured to the tops of the lower side rails 23. As shown in Fig. XXXI, the doors 112, 113 respectively close against buffer strips 121, 122 of rubber at the opposite ends of the truck body, each such buffer strip having a metal backing 123 (as instanced in Fig. XXXIII) which is secured to a vertical channel bar 124 set into an interval between the frame angle 39 of the corresponding end wall 37 of the truck body, and the side rails 27. At their remote edges, the doors 112, 113 are fitted with hook latches 125, 126 which lock respectively into openings (not shown) formed in the channel bars 124, said latches being operable by means of suitable keys from the exterior of the truck body.

The modified truck body featured in Figs. XXXV–XLI, is provided at each side with a plurality of doors 130—134 of sheet metal which are swingable in vertical piano hinges 135 in line with certain of the uprights or posts 9. At their upper ends, the axis rods 136 of the door hinges 135 pass through outwardly extending horizontal flanges 137 formed on the uppermost side rails 138 of the body, and at their lower ends are engaged in bushings 139 set into the tops of the lowermost side rails, which in this instance are well rounded as at 140 in Fig. XXXIX and reinforced by braces whereof one is shown at 141. Diametral cotter pins 142 on the hinge rods 136 bear against the undersides of the flanges 137 on the top side rails 138, while nut heads 143 on the protruding upper ends of the rods compress split spring washers 144 against the upper faces of said flanges to hold said rods in position. Instead of being formed with outwardly rolled beads as in Fig. V, the uppermost side rails 138 are in this instance formed at the top with inward semi-circular roundings 145 which meet the upturned flanges 78 on the roof sheets 75. The hinge 135 for the door 130 nearest the front end of the body at each side of the latter has one of its wings secured to a wooden strip 146 fastened by screw bolts 147 to the front end wall 37 as shown in Fig. XL. Each of the other hinges is common to two of the doors. Along their swinging edges the doors 130, 132 are provided with lap strips 148 to engage over the swinging edges of the respectively adjacent doors 131, 133 after the manner exemplified in Fig. XL. Each rearmost door 134 is also provided with a lap strip 149 which engages an angle stop bar 150 on the rear end wall 38 of the body after the manner exemplified in Fig. XLI. Key-operable latches shown at 151 serve to lock the doors 130—134 in closed position. Incorporated with the truck body of Figs. XXXV–XLI in addition to the longitudinal signboard 45 is a transverse rear signboard 152 which is shown in detail in Fig. XXXVI, and which, like the board 45, has a panel 153 of sheet metal with a tubular frame 154. Pendant from the sign board 152 are spaced screw shanks 155 which pass down through registering apertures respectively in the frame angle 156 of the rear wall sheet 38 and in the uppermost rear cross member 10. Interposed respectively between the sign 152 and the framing angle 156 and between the latter and the cross member 10 and surrounding the shanks 155, are tubular spacers 157, 158. Nuts 159 engaging the lower ends of the shanks 155 force apertured washer plates 160 against the bottom of the cross member 10 and thereby secure the signboard 152 in place. Affixed by bolts 161 to the top of the signboard 152 is an overhanging housing 162 of sheet metal which contains three tail lights 163 such as required by law for trucks, whereof the red lenses 164 protrude through openings in the rear wall of said housing. As shown in Fig. XXXVIII, the housing 162 is open at the bottom to permit projection of light through auxiliary clear lenses 165 of the lamps 163 to illuminate the rear face of the signboard 152.

In the form of my improved truck body illustrated in Figs. XLII–XLVI, a compartment 166 is provided in the rear at one side for reception and carriage of a refrigerating cooler R of the type ordinarily used in establishments where bottled beverages are sold or dispensed. In this construction, one or more uprights or posts are omitted at the compartment side of the body, and the intermediate side rails 26m terminated at the intermediate cross members 11m supported by the uprights designated 9m. The cross members indicated at 11n, it will be noted from Fig. XLV, terminate in the longitudinal median plane of the body and are supported there by a supplemental upright or post 167 which is secured at the bottom to a short supplemental center sill 168 supported by beams 169, 170 extending crosswise between the main sills 1, 1. The auxiliary upright 167 and the corresponding regular upright at 9n are made wider than the other uprights as are also the corresponding cross members 11n, for the purposes of greater strength. This is moreover the case with the uprights 9m and the corresponding cross members 11m, which except for the lowermost one, are devoid of lateral flanges at one side. The rear end wall 38 of the truck body also serves as the outer end wall of the compartment 166, the inner side wall and the back wall of said compartment being formed by sheets 171 and 172. As shown, the sheet 171 is bolted to the cross members 11m, while the sheet 172 is bolted top and bottom to longitudinal angle bars 173, 174 of which the former is secured to certain of the roof sheets 75, and the latter to the supplemental sill 168, see Fig. XLV. At intermediate points the wall sheet 172 is secured to angle bars 173m carried by the inner ends of the short cross members 11n. The inner edge of the sheet 171, see Figs. XLIV and XLV, is bolted to a laterally bent flange 175 at the inner edge of the sheet 172. The floor sheet 176 for the compartment 166 is supported by the supplemental sill 168, and by the regular sill 1 and the lower side rail 23 at the compartment side of the body, as well as by a beam 177 bridged between said regular sill and side rail. Adjacent each of its opposite long edges, the compartment floor sheet 176 is formed with a pair of upstanding parallel ridges 178, the intervals between these ribs constituting grooves or tracks 179 for the feet F of the refrigerating coolers R, R¹, R² of different sizes which may be carried in the body, see Fig. XLVI. Secured within these grooves 179 near the inner ends of the latter are lugs 180 which, see Fig. XLV, serve as stops for the corresponding pairs of feet F of the coolers to keep them away from the wall 172. For the purpose of preventing shifting of the coolers, in the body during transit, I have provided a hold down clamp 194 see Fig. XLV. As shown, the clamp 194 comprises a clamp bar 195 adapted to bridge adjacent slats 196 in the bottoms of the coolers, said bar being swingable about a spindle 197 whereof the lower end is threaded and selectively engageable with nuts 198, 198x which are welded fast beneath the floor 176 of the compartment and which are so spaced that the first serves for coolers R, R¹ of the small and intermediate sizes, and the second for the cooler R² of the largest size. At the top, the clamp spindle 197 is formed with a crosswise manipulating handle bar 200, and at an intermediate point with a collar 201 adapted to bear down upon the clamp bar. For the support of the feet F² at the projecting end of the largest cooler R², I have provided, see Fig. XLV, extension brackets 183 in line with the grooves 179, one of these being illustrated in detail in Figs. XLVII and XLVIII. As shown, each of these brackets 183 comprises a bracing component 184 of sheet metal which abuts the vertical face of the lower side rail 23 at the compartment side of the truck body, and a horizontal foot supporting component 185, likewise of sheet metal which is welded to the top of the compartment 184 and which overhangs the latter to rest in the top of said side rail 23. The component 185 is formed with upstanding side and end flanges 186, 187 and 188, 189 respectively to provide a recessed retaining seat or socket for the cooler foot, the outer end flange 189 being rounded as shown to facilitate sliding of the cooler foot thereover incident to loading and unloading. Pendant from the overhanging portion of the component 185 is a pair of studs 190 which engage holes in the top of the rail 23. The vertical web of the component 184 is pierced for passage of a securing screw bolt 191. At the region of each of the brackets 183, the side rail 23 is reinforced by a backing angle 192 which is penetrated by the studs 190 as well as by the securing bolts 191.

The alternative form of my invention illustrated in Figs. XLIX and L is generally of the same construction as the form of Figs. XLII–XLVI except that here the compartment 193 extends from side to side of the truck body, thereby making it possible to carry two refrigerating coolers side by side, for example, one of the large type R² and one of the smaller ones shown as of the type R. In this modification, hold down clamps 194 like those of the last described form of my invention are provided to hold the coolers against shifting during transit. The component parts of the clamps 194 here have been identified with the same reference characters previously employed to dispense with the necessity for repetitive description.

The alternative form of my invention illustrated in Figs. LI–LVIII is like that of Figs. XLII–XLVI except in that here the floor 205 of the cooler compartment at one side of the truck is depressed below the floor level of said body to provide more head room and thus make it easier to load and unload the coolers. As shown in Fig. LIII, the main sill 1t at the compartment side of the body is shorter than the other main sill 1 and abuts a transverse beam 206 which is supported at one end by said main sill 1, and at the opposite end by the lowermost side rail 23t at the compartment side of the body. At its top, the beam 206 is welded or otherwise secured to the main sill 1t as well as to one of the lowermost cross members designated 11a which extends all the way across the body. Along its lower edge, the beam 206 has a laterally-projecting flange 207 wherein rest the front ends of a pair of sub sills 208, 209 whereof the first is in line with the regular sill 1t, and whereof the second is positioned in the vertical median plane of the truck body, said sills being all of Z-cross section. Rising from the sub sill 208 is a supplemental upright 210. Also rising from the sub sill 209 in the interval between the supplemental upright 211 and the crossbeam 206 are supplemental uprights 212, 213 which are in spaced transverse planes with corresponding supplemental uprights 9t, 9u, rising from the main sill 1. The cross members 11t, 11u corresponding to the uprights 9t, 9u terminate at the uprights 212, 213. Supported by a drop channel bracket 215 at the end of the main sill 1 is a short sub sill 216 of Z-section; and extending crosswise between said sub sill 216 and the end of the sub sill 208 is a beam 217 of Z-section whereof the lower flange supports the end of the intermediate sub sill 209. The portion of the lower side rail 23t at the compartment side of the truck body is depressed as at 218 rearwardly of the beam 206 to the level of the sub sills 208, 209. Resting on and secured to the tops respectively of sub sills 208, 209 and to the depressed end portion 218 of the side rail 23t is an inverted U-section cross member 219 with a lateral flange 220 at its inner side, which with the tops of the parts 208, 209 and 218 support the floor sheet 205 of the compartment. At their inner ends, the cross members 11t, 11u rest on a longitudinal angle bar 222, which is secured to the cross beam 206 and to the uprights 211, 212, 213 and closing the space between the sub sill 209 and said angle bar 222 is a sheet 223 which forms the inner wall of the compartment. At the side opposite the cross web 206, the compartment is defined by the front wall of a utility compartment 42t which rests on the portion of the sub sills 208, 216 rearward of the supplemental uprights 210, 211 and on a transversely-aligned angle section upright, such as the one at 224, rising from the lowermost side rails 23 and 23t.

If desired, the cooler compartment in the form of my improved truck body featured in Figs. LI-LIV may be made to extend all the way across said body from one side to the other, by resorting to simple changes which will be readily understood upon reference to Fig. LIII.

Having thus described my invention, I claim:

1. A truck body including a pair of laterally-spaced sills; uprights arranged at corresponding longitudinal intervals along opposite sides of the body and secured at their bottoms to said sills; and one piece cross members at different levels with central apertures at intervals along their lengths for passage of transversely-aligned pairs of uprights through them and respectively secured to such pairs of uprights.

2. A truck body including a pair of laterally-spaced sills; uprights arranged at corresponding intervals along the sills and secured at their bottoms to said sills; and sheet metal cross members of channel cross section at different levels, the horizontal webs which connect the flanges of said cross members being punched for passage of the uprights through them with provision on them of perpendicular securing tabs for connection of said members to said uprights.

3. A truck body including a pair of laterally spaced sills of Z-cross section; uprights of channel section arranged at corresponding intervals along the sills with their bottom ends resting on the bottom flanges of the sills and with the backs of their cross webs abutting and secured to the vertical webs of said sills; and cross members secured at different levels to said uprights.

4. A truck body according to claim 1, wherein the cross members are of invert U-cross section with laterally-projecting flanges which form ledges to support bottle cases or the like at the different levels between uprights.

5. A truck body according to claim 1, wherein the cross members are fashioned from sheet metal to invert U-section with laterally-projecting flanges which form ledges to support bottle cases and the like at the different levels between uprights; wherein the ends of the cross members extend beyond the uprights at opposite sides of the truck; and wherein the sides of the ridges of said cross members are angularly notched at the ends to form bevels which are closed by bending down the tabs resulting from the notching.

6. A truck body according to claim 1, wherein the sills are spaced to correspond with the longitudinals of the truck chassis frame for support upon the latter; wherein the cross members extend beyond the uprights at opposite sides of the truck and have laterally-projecting ledges to support bottle cases and the like at the different levels between uprights; and wherein the cross members at each level are connected at opposite ends by longitudinal rails with upstanding rounded beads over which the boxes may be readily slid in loading and unloading and by which said boxes are retained in the truck body.

7. A truck body according to claim 1, wherein the lowermost cross members rest on the sills.

8. A truck body according to claim 1, wherein the cross members have laterally projecting ledges to support bottle cases and the like at the different levels between uprights; wherein the lowermost cross members rest upon the sills; and wherein floor plates are supported between the ledges of said lowermost cross members.

9. A truck body including a pair of laterally-spaced sills; uprights arranged at corresponding intervals along the sills and secured at their bottoms to said sills; vertically-spaced cross members secured to the uprights at different levels with their opposite ends extending outward beyond the uprights, said cross members being of invert U-section with ledges projecting laterally from the bottom of their side flanges and having apertures in their transverse webs at intervals along their lengths through which the uprights pass; and lengthwise rails connecting the ends of the cross bars at opposite sides of the body, said rails being formed from sheet metal with upstanding rounded beads at their outer edges and with their inner edges marginally retroverted and secured to the ends of the cross bars at the bottoms of their lateral ledges.

10. A truck body including a pair of laterally-spaced sills; uprights arranged at corresponding intervals along the sills and secured at their bottoms to said sills; vertically-spaced cross bars secured to transversely-aligned pairs of the uprights; and one piece bracing elements having vertical portions of channel section embracing adjacent uprights and horizontal portions connecting said vertical portions at the levels of the cross members.

11. A truck body according to claim 10, wherein the bracing elements are arranged in sequence diagonally of the body and connect adjacent uprights at the different levels.

12. A truck body including a pair of laterally-spaced sills; uprights arranged at corresponding intervals along the sills and secured at their bottoms to said sills; one piece cross members of invert U-cross-section secured to transversely-spaced uprights at the different levels, the cross webs of said members being apertured at intervals of their lengths for passage of the uprights through them; and a pair of diagonally-arranged bracing bars in the medial longitudinal plane of the body secured at different points along their lengths to various of the cross members.

13. A truck body according to claim 1 including a roof of sheet metal with crosswise ridges fitting over the tops of transversely-aligned pairs of the uprights.

14. A truck body according to claim 1, including a roof of sheet metal with crosswise ridges fitting over the tops of transversely-aligned pairs of the uprights, and wherein the roof is formed with upright flanges between ridges along opposite sides of the body, and with drain apertures at bottom corners discharging into hollows in the uprights.

15. A truck body including a pair of laterally-spaced sills; uprights arranged at corresponding intervals along opposite sides of the body and secured at their bottoms to said sills; one piece cross members of invert U-cross-section having apertures at intervals lengthwise of their cross webs through which transversely aligned pairs of the uprights pass and lateral ledges projecting outwardly from the bottoms of their side flanges and extending beyond the opposite sides of transversely-aligned pairs of the uprights at different levels to support bottle cases or the like; and a roof of sheet metal with crosswise ridges fitting over the tops of transversely-arranged uprights to form barriers between bottle cases supported on the roof.

16. A truck body including a pair of laterally spaced sills; uprights arranged at correspondingly arranged intervals along the sills and secured at their bottoms to said sills; vertically-spaced cross bars secured to transversely arranged pairs of the uprights; and bracing elements diagonally arranged in a vertical plane longitudinally of the truck and interconnecting the uprights, each such bracing element being integrally formed with vertical end portions of channel section which embrace adjacent uprights, and horizontal portions connecting said vertical portions at the level of a cross bar.

GEORGE W. PARKER, Jr.